United States Patent [19]

Brachert et al.

[11] 3,928,514

[45] Dec. 23, 1975

[54] PROCESS FOR THE PRODUCTION OF GUDOL POWDER UTILIZING REDUCTION OF MOISTURE CONTENT

[75] Inventors: Heinrich Brachert, Troisdorf-Oberlar; Dieter Girke; Joachim Kleiss, both of Liebenau, all of Germany

[73] Assignee: Dynamit Nobel Aktiengesellschaft, Troisdorf, Germany

[22] Filed: Apr. 3, 1974

[21] Appl. No.: 457,610

[30] Foreign Application Priority Data
Apr. 3, 1973 Germany............................ 2316538

[52] U.S. Cl................. 264/3 B; 264/3 R; 264/3 C; 149/104
[51] Int. Cl.².......................................... C06B 21/00
[58] Field of Search....... 264/3 R, 3 B, 3 C; 149/97, 149/99, 104, 107

[56] References Cited
UNITED STATES PATENTS

| | | | |
|---|---|---|---|
| 2,168,020 | 8/1939 | Brooks, Jr. | 264/3 C |
| 3,140,211 | 7/1964 | Berthmann et al. | 149/104 X |
| 3,579,392 | 5/1971 | Enoksson | 149/104 X |
| 3,800,012 | 3/1974 | Hiorth | 149/104 X |

*Primary Examiner*—Harvey E. Behrend
*Assistant Examiner*—P. A. Nelson
*Attorney, Agent, or Firm*—Craig & Antonelli

[57] ABSTRACT

A process for the preparation of "Gudol powder" from a mixture of nitrocellulose, diglycol dinitrate, nitroguanidine, and additives, wherein an aqueous raw mixture of nitrocellulose and diglycol dinitrate is premixed with the other components, the said final mixture then dehydrated in part, plasticized, and finally pressed into the final shape of the powder product. The improvement in the process comprises reducing the water content of the premixed components in a first drying stage, then homogenizing and preplasticizing the premixed components in a continuously operating masticator, thereafter further reducing the water content of the composition in a second drying stage, thereupon plasticizing and converting the composition into granular form in a continuously operating extruder, adjusting the moisture control of the granulated material to a required pressing or extruding moisture, and finally extruding the granulated material to the final shape of the powder product in a continuously operating extruder.

6 Claims, 1 Drawing Figure

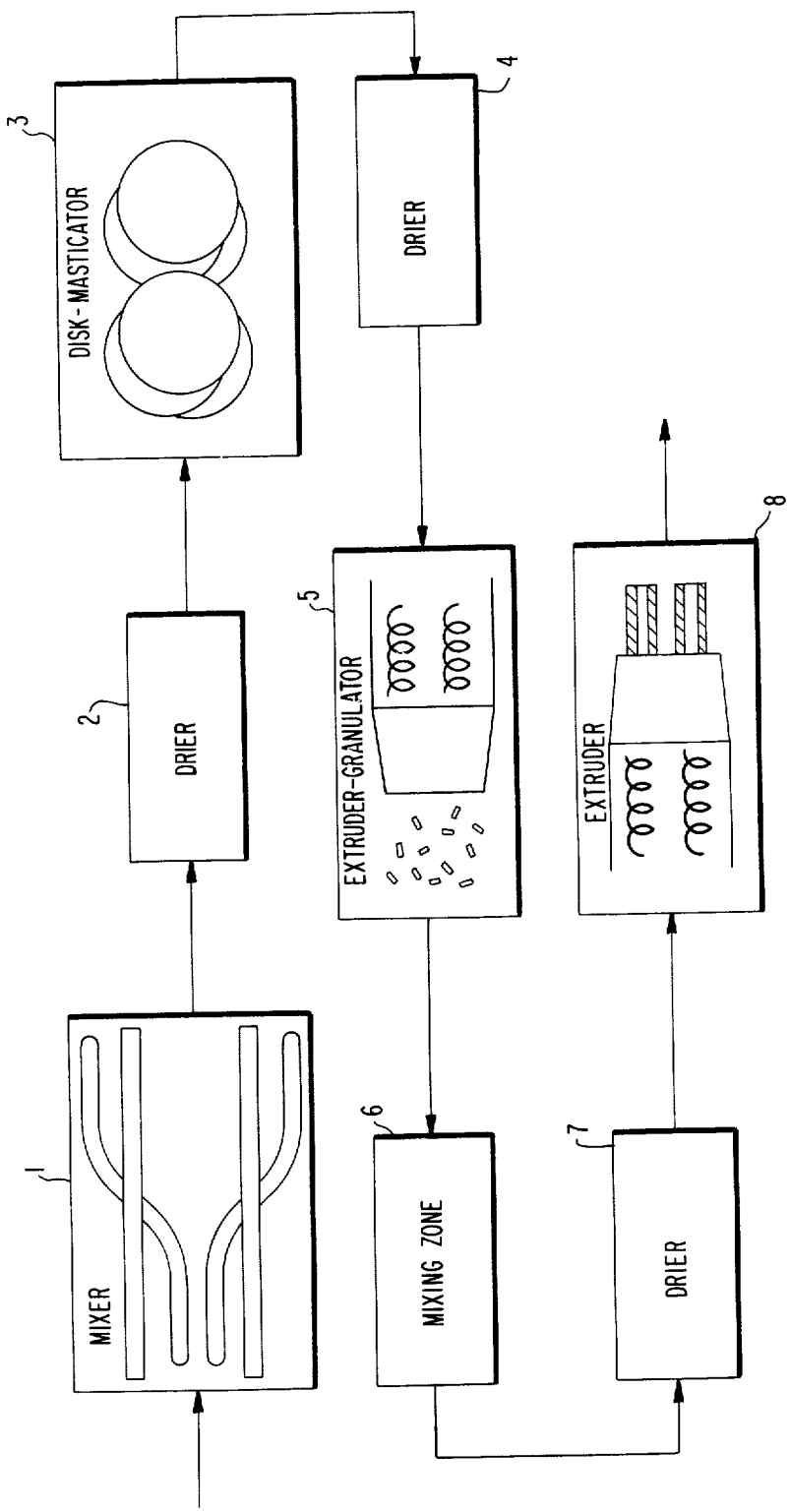

PROCESS FOR THE PRODUCTION OF GUDOL POWDER UTILIZING REDUCTION OF MOISTURE CONTENT

This invention relates to a process for the preparation of "Gudol powder" from nitrocellulose, diglycol dinitrate, nitroguanidine and conventional additives, wherein an aqueous raw mixture of nitrocellulose and diglycol dinitrate is premixed with the other components, then dehydrated in part and plasticized and, finally, pressed into the final shape of the powder product.

The "Gudol powders" are solvent-free triple-base pressed or molded propellant powders made up of the components nitrocellulose, diglycol dinitrate, nitroguanidine, and additives, such as, for example, stabilizers or plasticizers. The production of such powder products in the form of tubes has heretofore been conducted by mixing and initially masticating an aqueous raw powder mixture of nitrocellulose and diglycol dinitrate in a mixer-masticator with nitroguanidine and the necessary stabilizers and additives. This masticated product is then rolled into a sheet on a rolling frame suitable for powder processing while repeatedly being passed through the roll gap. During this processing step, the composition is dewatered and simultaneously plasticized. The sheet is then rolled up to a so-called sheeting roll which is finally pressed by means of a barrel extruder to the final "Gudol powder" in the form of, for example, tubes. The tubes exit as long tubular strands from the die of the barrel extruder and are cut to the final length which can be, depending on the purpose for which the powder product is used, between 30 and 60 cm.

A disadvantage in this process is that the sheet rolling step and the production of the rolled-up sheet always requires manual operations, and the quality of the powder product depends on the degree of carefulness exercised during the processing. Even in case of mechanical auxiliary means, the influence of the roll operator cannot be excluded. The uniformity of the final product is impaired, in particular, by the facts that the rolling step must be effected batchwise, that the product cannot be manufactured with constant quality, and that the resultant differences cannot be entirely compensated for by a mixing procedure. The qualitatively differing powder tubes can be brought to a certain average quality by cumbersome manual sorting, but this average quality still has very scattered values inherently thereby providing a disadvantageous influence on the internal ballistics properties of the powder.

The amount of the batch which is individually processed in each case varies, depending on the size of the rolling frame, but nowise exceeds 20 kg. Also, the operation of the barrel extruder is very time-consuming. The barrel extruder must be filled and then evacuated so that, during the subsequent pressing or extruding operation, no shrinkholes occur in the tubular strand of powder, and the strand is prevented from becoming porous. The strand sections at the beginning of the pressing step have a somewhat different quality than during the main pressing phase, and furthermore, the external conditions, such as they exist, for example, in the inlet toward the die, are not always the same during the entire pressing operation. Moreover, as a consequence thereof, the wall thickness of the powder tubes is varied, for example, resulting, in turn, in a change of the tube weight and thus of the internal ballistics properties. Thus, for example, in the tube product, a wall thickness of 1 mm must be maintained within a margin of at least 0.05 mm. This is not ensured, at least not in the initial and final stages of the barrel extruding operation.

An additional considerable disadvantage of the known process is that due to the great frictional stress on the powder in the roll gap, fires have frequently started in the rolling plant, the consequence of which are graver, the larger the amount of the batch being processed.

This invention is based on the problem of avoiding the above-described disadvantages during the manufacture of "Gudol powder," i.e., to make the manufacturing process more economical and safer and to exclude, in particular, the human influence during the production, in order to obtain a powder product of a maximally uniform high quality.

It has now been found that this problem can be solved advantageously by executing the following steps during the process for the manufacture of "Gudol powder" from nitrocellulose, diglycol dinitrate, nitroguanidine, and conventional additives, wherein an aqueous raw mixture of nitrocellulose and diglycol dinitrate is premixed with the further components, then dewatered (i.e., dehydrated in part), as well as plasticized and finally pressed to the final desired shape of the powder product. The water content of the premixed components is reduced, according to the present invention, in a first drying stage; then the premixed components are homogenized and preplasticized by means of a continuously operating masticator; thereafter, the water content of this mixture is still further reduced in a second drying stage; thereupon, the mixture is plasticized and converted into granular form by means of a continuously operating extruder-granulator; then, the moisture of the granulated material is adjusted to the desired pressing or molding moisture; and finally, the granulated material is pressed or molded into the final shape of the powder product by means of a continuously operating extruder.

Although it is known from the processing of double-base rocket propellants to employ continuously operating extruders, the "Gudol powders" are different from rocket propellant powders in that the "Gudol powders" have a very high solids content (preferably 30–40% by weight of nitroguanidine) and additionally contain considerably less water (i.e., from 0.5 to 1% by weight compared with 4 to 10% by weight for rocket propellant powders; the given water content refers in both cases to the last processing stage), so that their processing viscosity is very high, as compared to that of rocket powders. As a consequence thereof, very high operating pressures (e.g., on the order of 80 to 200 kp/cm$^2$) must be employed with a correspondingly high mechanical stress on the composition to be processed, whereby, in turn, the danger of an unintended ignition of this composition is greatly increased. This danger, by the way, is furthermore very much more acute than in case of rocket propellant powders because the high solids content and the low water content result, independently of the increase in viscosity, in a direct rise of the friction occurring between the individual particles. Another aggravating circumstance is that, due to the desired extruded profile of the powder products, for example, tubes having an inner diameter of only about 1 to 2mm. and an outer diameter of 3 to 5 mm., very high requirements must be met by the die producers with respect to the required mechanical stability of the tools used for forming the products. Therefore, it was surprising that, in spite of these actually unfavorable conditions, a processing of the "Gudol powder" compositions on extruders and continuously operating masticators has been made possible.

The premix from the individual components can be prepared batchwise in one of the conventional mixer-masticators. The initial drying operation, taking place in two stages, as well as the adjustment of the pressing moisture can likewise be accomplished batchwise, but also continuously. In the latter continuous procedure, the possibility then exists to conduct the entire process — starting with the premix — continuously, i.e., without interruption between the individual process steps. In any case, any manual effect on the powder quality is advantageously avoided by this procedure. All essential process steps can be conducted by means of appropriate control devices automatically, so that only a small number of operating personnel is required which personnel, additionally, need not be present in the immediate vicinity of the processing installation.

All individual process steps can be exactly monitored and recorded, so that any occurring disturbances can be rapidly recognized and corresponding remedies instituted. If an unintended ignition of the composition to be processed should take place after all at some time, the danger thus produced is relatively minor as compared to the conventional "Gudol powder" production, since the portion of the composition endangered thereby is not longer the entire amount of the batch of, e.g., 20 kg., as in the conventional process, but rather merely the proportion located in the zone of the outlet end of the continuously operating masticator and/or extruder. This proportion is generally only 0.5 – 1 kg.

As a continuously operating masticating device, a combined masticator of the firm Buss in Basel, Switzerland, the screw of which executes also a periodical axial movement in addition to the rotary motion, can be utilized, for example. However, with a view toward a maximally intensive mastication, a so-called disk-type masticator is preferably employed, wherein disks eccentrically arranged on a horizontally disposed rotating axle press the mixture to be processed against the enveloping cylindrical wall and thereby effect the preplasticization of the mixture. The mixture is fed at one end of the cylinder and discharged at the other end. The plasticization, granulation, and shaping can basically be carried out by means of one of the extruders known in the art and suitable for these purposes.

The composition to be processed is dried in order to avoid, at elevated temperatures, a recrystallization of the nitroguanidine which takes place under the concomitant effect of water. This recrystallization would result in larger crystals of a different structure, which cannot be processed as well and are accordingly undesirable. In the first drying stage, the water content is reduced to about 5 to 10% by weight by heating to a temperature of from 50° to 60°C., and in the second drying stage to about 0.5 to 5% by weight, preferably about 1% by weight by heating to a temperature of from 50° to 60°C. The batch-wise drying operation can be conducted, for example, in hurdle drying plants while the continuous drying operation can take place, for example, in tunnel furnaces having a conveyor belt extending therethrough, or by means of vibrating screw dryers. The final pressing or molding moisture content is about 0.5 to 1% by weight, preferably about 0.6% by weight. The moisture of the granulated material can be adjusted to this value either batchwise or continuously. For this purpose, the granulated material can, for example, be stored at ambient temperatures, e.g., 20°C, for an intermediate period of time, so that the required pressing moisture is attained by moisture exchange with the surroundings. Depending on the circumstances in each individual case, however, it is also possible in this case to accomplish the drying step, for example, at an elevated temperature, e.g., from 70° – 80°C.

A suitable further development of this invention provides that the granulated material is intermixed by means of a mixing device preferably before the pressing moisture is set. The mixing operation is preferably effected prior to setting the pressing moisture because, during the mixing step, changes in the moisture content are still possible. Consequently, it is possible in an extremely advantageous manner to completely equalize not only possible differences in quality within a single batch, but also within an entire powder lot, by mixing the granules of all batches with one another. The mixing can be accomplished by means of one of the conventional mixing devices. The mixed granulated material is then continuously pressed or molded into the final shape of the powder product. The continuous pressing step results in powder strands, rods, cords or tubes of an entirely identical density, surface characteristic, and dimensions, so that the final product is completely uniform and consequently does not exhibit any scattered characteristic values with respect to the internal ballistic properties, either.

In accordance with a further suggestion of the present invention, the individual components are fed continuously by means of metering devices to a mixing and/or masticating unit wherein they are continuously premixed. Thus, all process steps, except for the possible mixing of the granulated material can basically be conducted continuously. In case of special compositions or starting substances for the "Gudol powder" to be produced, it is possible that the homogenization and preplasticization obtained by means of a single masticator does not yet satisfy the requirements. For this case, another suggestion of this invention provides to pass the premixed components repeatedly through the masticator. For this purpose, the mixture to be processed can either be passed several times through one and the same masticator, or also through several series-arranged masticators. If, in such instances, the thus-obtained granulated material is still too porous and/or exhibits too low a density, the granulated material can, according to this invention, be plasticized by means of a continuously operating extruder and then again be converted into granular form. This repeated plasticization and granulation can take place before or also after the possible intermixing of the first-produced granulated material.

In order to keep the mechanical stress on the powder at a minimum, it proves advantageous to conduct, according to this invention, the granulation and the extrusion or pressing into the final shape of the powder product by means of twin-screw extruders rotating in the same direction.

The process of this invention will be described in greater detail with reference to one example and to the accompanying drawing which is a schematic flow diagram illustrating the successive steps of the process.

The starting substances for preparing the "Gudol powder" comprise 56.25% by weight of a raw powder mixture containing 70% by weight of nitrocellulose and 30% by weight of diglycol dinitrate (calculated on the dry weight basis of the total weight of the mixture) with about 35% by weight of water, 30% by weight of nitroguanidine, and 13.75% by weight of stabilizers, i.e., methyl diphenylurea, plasticers, i.e., ethylphenylurethane and diphenylurethane, lubricants, i.e., candelilla wax, and other additives, i.e., potassium nitrate — a muzzle flash reducing agent. (It will be understood that the raw powder mixture consists, therefore, of 35% by weight of water and 65% by weight of a mixture of nitrocellulose and diglycoldinitrate — this latter mixture consists itself of 70% by weight of nitrocellulose and 30% by weight of diglycodinitrate). The starting substances (e.g., 200 kg) are mixed together, just as in the conventional process for preparing "Gudol powder," batchwise in a mixer-masticator 1 having a capacity of up to 400 kg. In the schematic representation of the mixer-masticator 1, two parallel-arranged shafts are indicated, provided with, respectively, two curved vanes. The premixed mass is transferred into the first drying stage 2 at 60°C., where the water content is reduced to about 5 to 10% by weight. Thereafter, the mixed composition, after storing in kettles, barrels, or the like if necessary, is introduced gradually into the continuously operating masticator 3, which is a disk masticator. From here the mass is fed continuously through the further process stages or steps. The continuously working plant apparatus are dimensioned, for example, so that 20 kg. powder per hour passes through. In particular, after passing three times through the disk masticator, the mass is homogenized and preplasticized to such an extent that it can be fed to the second drying stage 4 at 50°C., where the moisture content is reduced to about 1% by weight. At this point, the actual plasticizing and granulating process follows in the extruder 5, which is a known twin-screw extruder operating in synchronism in the same direction of rotation. In this conventional device, two meshing screw spindles rotate in the same direction and masticate and compact the mass so that the resulting mixture of material can exit, at the end of this continuously operating screw extruder, via a perforated die with subsequently arranged cutting blades, in the form of a uniformly granulated material. The granules have cylindrical shapes with diameters of about 3 mm. and heights of about 3 mm.

The granulated material of all batches, which is already present in the final composition, is now uniformly intermixed in the mixing zone 6 in an amount corresponding approximately to one powder lot. Intermixing is effected by, for example, a drum which rotates about a horizontal axis and provided on the inside thereof with guide vanes in order to promote the mixing of the powder granulates of the various charges and to prevent a powder variation or slack. The drum is provided on the side surfaces and/or the mantle surface with flaps in a known manner, which at the presence of small internal pressure, are opened outwardly to establish communication to the atmosphere so that there is no enclosure. With an inadvertent ignition of the powder granules, there is not detonation but only burning. Amounts of up to about 50 tons can readily be made uniform in this way. The resulting mixture of granulated material still has a moisture content of about 1% by weight. The material is then further dried in a final drying stage, by means of a drying plant 7 — either a continuously operating spiral vibrating dryer or a hurdle drying plant to be serviced batchwise — to a water content of about 0.5% by weight, which is the predetermined pressing moisture. Due to the drying process and the elimination of water effected thereby, the composition of the granules is porous to a minor extent. In general, this quality is sufficient to obtain a flawless final product during the subsequent pressing step. If a certain composition is extremely difficult to process, which can be the case with special recipes or starting substances, a second granulating stage can be added immediately before the final forming by means of the extruder 8 in order to produce a maximum density in the granulated material. However, it can essentially be accomplished also immediately after the first granulation step by means of extruder 5, respectively, between the mixing zone 6 and the drying step 7.

From the final drying stage, the granulated material is then pressed or molded to the final geometrical configuration of the powder product in the last processing step, namely the shaping operation. The material is fed via a metering means into an extruder 8, with a multiple die connected thereto; in the present case, a die having 37 extrusion outlets. The extruder is here again a twin-screw extruder with identical directions of rotation, with meshing screw spindles. Only two of the 37 extrusion outlets are indicated in the schematic view. The exiting tubular strands having an outer diameter of 3 to 6 mm. and an inner diameter of 1.5 to 2.5 mm. then need only be cut to length, e.g., 30 to 60 cm. A mixing of the thus-obtained powder is advantageously no longer necessary. In both extruders 5 and 8, the tool temperatures are maintained at about 80° to 90°C. by external heating. The pressure in front of the dies is about 220 kp./cm$^2$.

This process renders the composition of the final product absolutely uniform. The thus-obtained powder cylinders exhibit, in addition to having the same composition, also identical geometrical dimensions, and the same density and surface characteristics.

It will be understood that the term "Gudol powder" refers to a solvent-free three-basic propellant-charge powder and is well known to those in the propellant art. The *Dictionary of Explosives, Ammunition and Weapons* (German Section) published by Picatinny Arsenal as Technical Report number 2510 on page 81 provides a detailed description of this propellant.

Moreover, it will be appreciated that the proportions of the individual components of the "Gudol-powder" may vary between the following limits:

| | | | |
|---|---|---|---|
| Nitrocellulose | 20 to 50 | weight | % |
| Diglycoldinitrate | 15 to 35 | " | " |
| Nitroguanidine | 5 to 60 | " | " |
| Softener | 3 to 10 | " | " |
| Stabilizers | 0.5 to 2 | " | " |
| Equalizer less than | 2 | " | " |
| Other additional material less than | 2 | " | " |

The weight portions of the various components are, in each case determined such that the total mixture adds up to 100%.

From the above detailed description, it will be recognized that the temperature in the drying step 4 can be lower than in the drying step 2 since the quantity of water to be evaporated in the drying step 4 is smaller than in the step 2.

It will be also appreciated that the "Gudol-powder" is generally compressed into powder tubes. It is further known, to provide these powder tubes with a radial slot which extends over the entire length of the tube. This slot connects the inside of the tube with its surroundings in use and, therefore, facilitates the ignition process. This is especially true with longer powder tubes since the ignition flame can not only penetrate into the powder tube from the ends thereof but also via the radial slot. This powder is also designated as slot powder. Instead of this, the "Gudol-powder" could, for example, also be compressed without difficulty into a small flat band, a string with circular cross section or also into a so-called "Y-powder." The "Y-powder," in its cross section is provided with three legs of the same length and width which are each displaced by 120° from each other. From these examples it is evident that the specific cross sectional shape of the compressed "Gudol-powder" is unimportant for the inventive method (process).

Also, in the conventional process for the manufacture of "Gudol-powder," the final forming of the powder is accomplished by a so-called "pot press." With this process, the entire charge is in a relatively thick-walled pot-shaped container which, at its bottom surface, is provided with discharge openings for the powder strands. The entire powder charge is put under pressure by means of a movable piston (plunger) arranged on the top portion of the container. Therefore, the entire powder mass, contained in the pressure pot is in a so-called enclosure. If ignition of the powder should occur in this case, the powder is immediately detonated which represents a danger to the surrounding.

In contradistinction thereto, the powder mass in the process of this invention, as exemplified above, remains in the continuously working kneading device 3 and the continously working extruders 5 and 8 only in a very limited space area in the so-called enclosure. This area is at the discharge end of the aforementioned device and extends over about 0.5 to 1.5 spiral length, respectively, a corresponding distance in a disk kneader. Only during this relatively short zone is the powder mass under the total (full) pressure. In the area ahead of the kneading, with respect to the extruding device, the powder is essentially under atmospheric pressure. Only shortly before the enclosure zone the powder pressure increases to the required pressure. If ignition would take place in these devices, only the portion of the powder in the enclosure zone is detonatively transformed. The powder mass in the remaining portion of the devices, on the other hand, burns harmlessly since, as a result of the absence of an enclosure, the pressure buildup for detonation is not present. Only 0.5 to 1 kg. of the powder mass are in the short enclosure zones.

For the execution of the process of this invention, it will be recognized no special, i.e., unconventional devices are required. Further, known machines used with the processing of synthetic material can be utilized. For example, a kneader with Sigma-blades can be utilized as the mix-kneader 1. The continuously working kneader 3 may be constructed as a disk kneader or also as a Ko-kneader, as described on pages 474 and 475 of the *Plastics Technical Dictionary*, published by Carl Hanser Verlag, Munich, Germany 1959. For the extruders 5 and 8, double worm extruders of the type RC 7 made by Reuz A9 in Wohlen/Switzerland, may be utilized.

While the novel principles of the invention have been described, it will be understood that various omissions, modifications and changes in these principles may be made by one skilled in the art without departing from the spirit and scope of the invention.

What is claimed is:

1. In a process for the preparation of "Gudol powder" from a final mixture of nitrocellulose, diglycol dinitrate, nitroguanidine, and additives, wherein an aqueous raw mixture of nitrocellulose and diglycol dinitrate is premixed with the other components, the said final mixture then dehydrated in part, plasticized, and finally pressed into the final shape of the powder product, the improvement which comprises reducing the water content of the premixed components in a first drying stage, then homogenizing and preplasticizing the premixed components in a continuously operating masticator, thereafter further reducing the water content of the composition in a second drying stage, thereupon plasticizing and converting the composition into granular form in a continuously operating extruder, adjusting the moisture content of the granulated material to a required pressing or extruding moisture, and finally extruding the granulated material to the final shape of the powder product in a continuously operating extruder.

2. The process according to claim 1, in which the granulated material is intermixed by a mixing device prior to adjusting the pressing moisture content.

3. The process according to claim 1, in which the individual components of said final mixture are continuously fed by means of metering devices to a mixing device in predetermined amounts, wherein the components are continuously premixed.

4. The process according to claim 1, in which the premixed components are passed several times through the mixing device.

5. The process according to claim 1, in which the granulated material is again plasticized in a continuously operating extruder and is again converted into granular form.

6. The process according to claim 1, in which the granulated and molding of the final mixture into the final shape of the powder product are effected by twin-screw extruders wherein the screws rotate in the same direction.

* * * * *